United States Patent [19]

Gauthier et al.

[11] 4,142,777
[45] Mar. 6, 1979

[54] DEVICE FOR CONNECTING OPTICAL FIBRES TOGETHER

[75] Inventors: Francis Gauthier, Oullins; Georges Mignien, Meyzieu, both of France

[73] Assignee: Societe Anonyme Dite: Les Cables de Lyon, Lyons, France

[21] Appl. No.: 798,190

[22] Filed: May 18, 1977

[30] Foreign Application Priority Data

May 26, 1976 [FR] France ................. 76 15945

[51] Int. Cl.² .............................................. G02B 5/14
[52] U.S. Cl. ................................................. 350/96.21
[58] Field of Search ..................................... 350/96.21

[56] References Cited

U.S. PATENT DOCUMENTS

| | | | |
|---|---|---|---|
| 3,734,594 | 5/1973 | Trambarulo | 350/96.21 |
| 3,768,146 | 10/1973 | Braun et al. | 350/96.21 |
| 4,056,305 | 11/1977 | McCartney et al. | 350/96.21 |

FOREIGN PATENT DOCUMENTS

| | | | |
|---|---|---|---|
| 2531857 | 2/1976 | Fed. Rep. of Germany | 350/96.21 |
| 7509800 | 2/1976 | Netherlands | 350/96.21 |

*Primary Examiner*—John K. Corbin
*Assistant Examiner*—Rolf Hille
*Attorney, Agent, or Firm*—Haseltine, Lake & Waters

[57] ABSTRACT

A connection device allowing optical fibres manufactures in a factory to be connected together in the field by end pieces. Each end piece comprises a fibre clamped between three cylindrical rods which lie tangential to each other in pairs and encompass a fibre in their central clamed. The end pieces are disposed on either side of a mounting assembly comprising alignment structures constituted by V-shaped grooves in which the fibre and the rods are inserted. Means are provided to press on the rods transversally. According to one variant, this function is fulfilled by elastomer cylinders compressed by clamping the plates of the mounting assembly. Application : Optical fibres for telecommunications.

14 Claims, 6 Drawing Figures

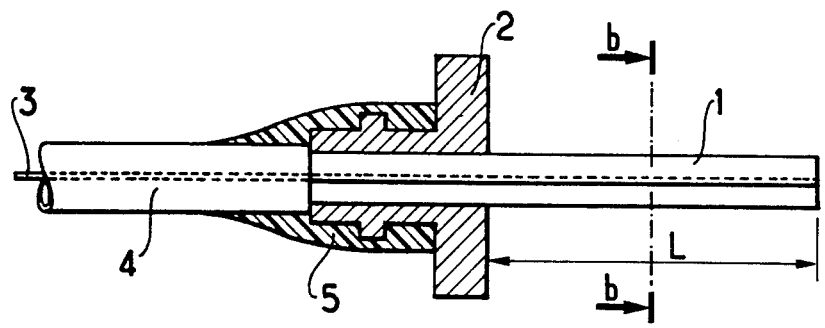
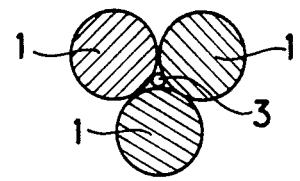
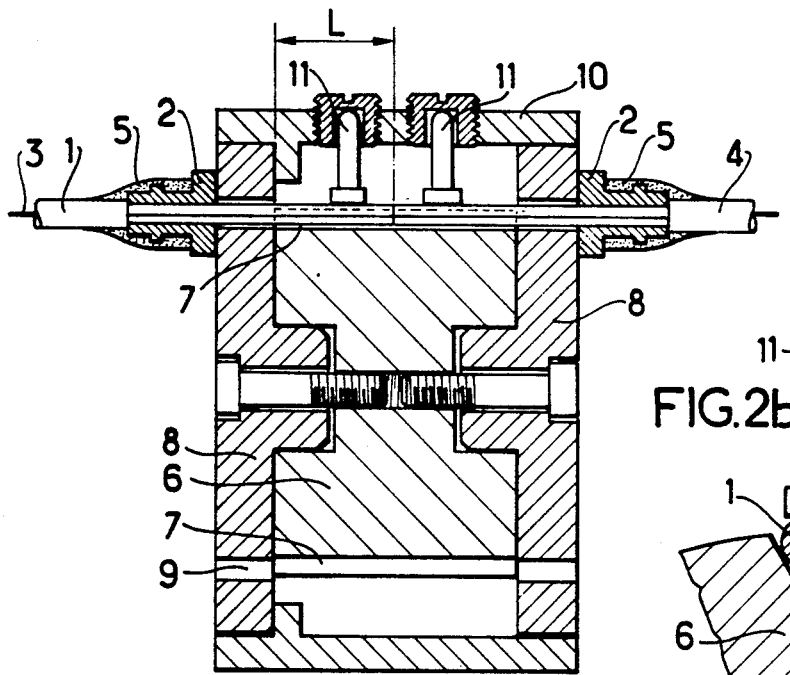

DEVICE FOR CONNECTING OPTICAL FIBRES TOGETHER

The present invention relates to a mechanical device for connecting optical fibres which enables connections to be made with little attenuation from one fibre to another.

It applies to the field of telecommunications by optical signals for the preparation of the connection of cables in the factory and for making the connection on site.

It is known to ensure the alignment of two facing optical fibres by means of a channel defined by three solid metal cylinders which lie tangentially to one another, in pairs. The disadvantage of connectors using this alignment principle is that none exist for connecting a multiplicity of fibres which is necessary for connecting cables. Each such connector is expensive and it would greatly increase the costs to multiply this number.

The device according to the present invention aleviates this drawback. It can be applied to a great number of fibres to be connected together belonging e.g. to a same cable head. It is also less expensive since the number of parts is small and the machining of these parts does not require great precision. Another advantage of this device is that it allows a new junction to be made without modifying the performance of the adjacent junctions. A junction can therefore be repaired or improved easily.

The present invention provides a device for connecting optical fibres together, the device comprising at least two fibre end pieces each terminating one of the fibres to be connected and a connection block for holding the end pieces end to end with their optical fibres aligned, wherein each fibre end piece includes three cylindrical rods which lie tangentially to each other in pairs and which encompass the end of one of the fibres to be connected, and wherein the connecting block includes a core having an axis of symmetry which extends parallel to the fibres to be joined and which includes a v-shaped groove formed in its periphery for each pair of fibres to be connected, the connecting block further including a pair of plates arranged on either side of the core, each plate receiving one fibre end piece of each pair of fibres to be connected, the end pieces projecting through their respective plates and lying in respective grooves of the core end to end with their corresponding end pieces for inter connection of their fibres; the connecting block further including means for applying transverse pressure on the three rods of each end piece to ensure proper alignment of each fibre in its v-shaped groove.

According to one embodiment, the means for applying transverse pressure are constituted by clamping shoes mounted for clamping movement perpendicular to the axis and bearing against an outer hoop which surrounds the core.

According to an alternative embodiment, said means for applying transverse pressure are constituted by at least one cylinder or tube made of an elastomer whose axis is parallel to that of the core, said cylinder or tube made of elastomer being compressed under the effect of means for bringing said plates closer together.

An example of the present invention will be described hereinbelow with reference to the accompanying schematic FIGS. 1 to 4, this example being given purely by way of an illustration having no limiting character. The same elements illustrated in several of these figures bear the same reference symbols in all these figures.

FIG. 1a is a longitudinal cross-section of a guide and centring end piece for optical fibres such as manufactured in a factory.

FIG. 1b is an enlarged view of the transverse cross-section, through b—b of FIG. 1a, of the end piece close to its end.

FIG. 2a is a schematic longitudinal cross-section of a connection device for use in the field.

FIG. 2b is a detail of a transverse cross-section of FIG. 2a taken close to the end of a fibre.

Figure 3:
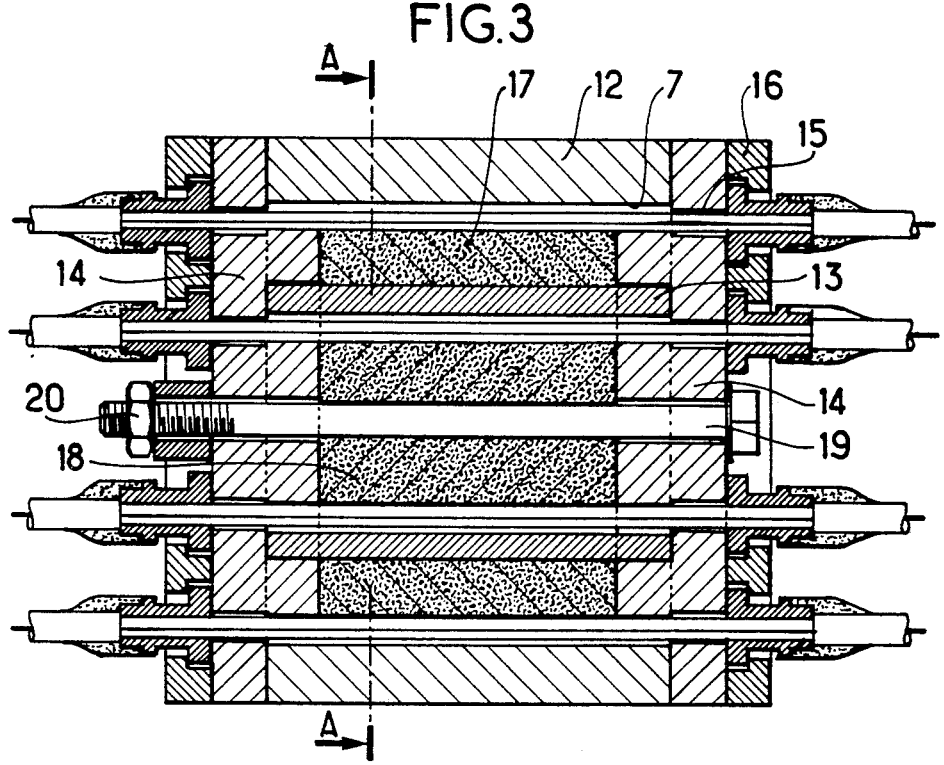
FIG. 3 is a schematic longitudinal cross-section of another embodiment of a connection device for use in the field.

As seen in FIGS. 1a and 1b, the optical fibres are prepared in the works so as to form end pieces terminating the optical channels. For this purpose the covered fibres composing a cable are prepared one by one. The protective coverings are removed by any suitable means. A suitable tool is used to cut each fibre to obtain a plane surface which is perpendicular to the axis. Three cylindrical rods 1 which lie tangentally to each other in pairs, are clamped longitudinally in a ring 2 or any other hoding means such as a thermoshrinkable ring, and define a channel in which the fibre 3 is inserted. The distance L between the end of the fibre and the ring 2 is reproduced with great precision by means of a gauge which positions the surfaces of the fibres in the plane of the cross-section of the rods. The outer cover 4 protecting the fibre is fixed to the ring 2, e.g. by means of a sleeve 5 made of epoxy resin, cemented to this ring and making it possible to form a strong end piece. The end pieces prepared at each fibre end are secured and protected, during storage and laying of the cable, by a cylindrical housing (not shown).

FIGS. 2a and 2b show a connection device as used in the field. It makes it possible to connect together a plurality of fibres e.g. fibres distributed around the circunference of a circle in a cable. Each fibre is ended by an end piece similar to the one in FIGS. 1a and 1b. The device serves to align in pairs the fibres of two cables which are to be connected together.

A cylindrical central core 6 comprises on its periphery V-shaped grooves 7 machined in the block of the core. These grooves serve as an alignment structure for each set of the rods 1 and with its fibre 3. Two lateral flanges 8 are pierced with a plurality of holes and allow two end pieces to be positioned in each alignment structure so as to bring them face to face at the standard distance L. An outer hoop 10 bears a plurality of pairs of clamping shoes 11 in order to secure the end pieces successively by bringing the rods 1 into the bottom of the V's. To do this the shoe 11 presses against the two rods 1 at the top of the V. Each end is mechanically independent from the one next to it. The surfaces of the optical fibres to be connected together are spaced apart by a few microns to a few tens of microns. This space can be filled with a fluid or solid substance which is intended to provide a better propagation of light from one fibre to the other. For this purpose this substance whose refraction index is close to that of the fibre is injected between the core 6 and the hoop 10.

The end pieces connected together in pairs by means of the alignment structure are protected from corrosion by the ambient medium by a sealed housing resulting from the assembling of all the adjacent parts.

Figure 4:
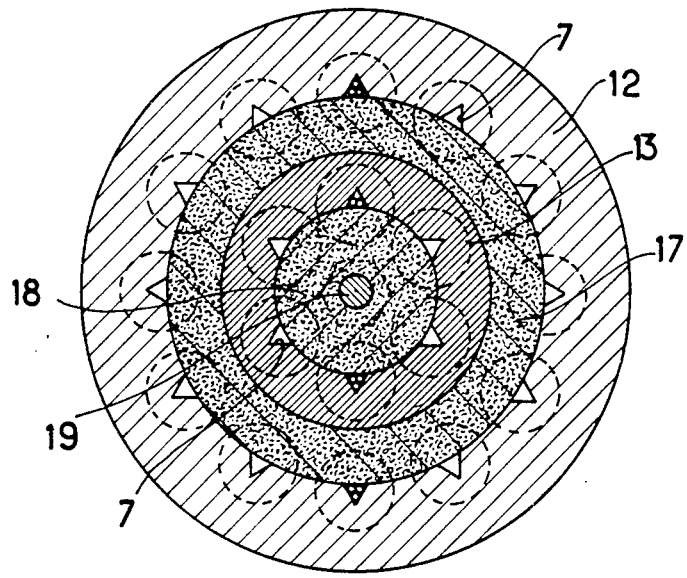
FIG. 4 is a transversal cross-section through A—A of the connection device of FIG. 3.

A variant of the assembly is shown in FIGS. 3 and 4.

Two coaxial cylinders 12 and 13 are fitted together and comprise structures for alignment with the V-shaped grooves 7 formed in the bore of each cylinder. Two side plates 14 pierced with holes 15 allow the end pieces to be inserted. A stop plate 16 holds the end pieces in position. Two elastomer cylinders 17 and 18 are disposed inside respective ones of the cylinders 12 and 13, all these cylinders have the same axis. A threaded bolt 19 and its nut 20 are situated on this axis. The side plates 14 are brought closer together by tightening the nut 20, this compressing the elastomer cylinders 17 and 18 and consequently pushing the rods 1 into the bottom of the V-shaped grooves. In this last case, the ends of the fibres to be connected together are no longer independent.

The housing formed by assembling all the aforementioned parts is water-tight and dust-tight to protect the junctions from ageing.

The connection device which is the object of the invention makes it possible to establish sealed junctions having low light propagation losses between two optical fibre cables.

Applications come within the field of optical fibres for telecommunications.

What we claim is:

1. A device for connectng optical fibres together, the device comprising a plurality of pairs of fibre end pieces each terminating one of the fibres to be connected and a connection block for holding the end pieces end to end with their optical fibres aligned, wherein each fibre end piece includes three cylindrical rods which lie tangentially to each other in pairs and which encompass the end of one of the fibres to be connected, and wherein the connecting block includes a cylindrical core having an axis of symmetry which extends parallel to the fibres to be joined and which includes a V-shaped groove formed in its outer periphery for each pair of fibres to be connected, the connecting block further including a pair of plates arranged on either side of the core, each plate receiving one fibre end piece of each pair of fibres to be connected, the end pieces projecting through their respective plates and lying in respective grooves of the core end to end with their corresponding end pieces for interconnection of their fibres; the connecting block further including means for applying transverse pressure on the three rods of each end piece to ensure proper alignment of each fibre in its V-shaped groove.

2. A device according to claim 1, wherein the plates are circular.

3. A device according to claim 1, wherein the means for applying transverse pressure are constituted by clamping shoes mounted for clamping movement perpendicular to the axis and bearing against an outer hoop which surrounds the core.

4. A device according to claim 1, wherein said means fo. applying transverse pressure are constituted by at least one cylinder or tube made of an elastomer whose axis is parallel to that of the core, said cylinder or tube made of elastomer being compressed under the effect of means for bringing said plates closer together.

5. A device according to claim 4, wherein said means for bringing said plates closer together are formed by clamping a nut on an axial rod.

6. A device for connecting optical fibres together, the device comprising a plurality of pairs of fibre end pieces each terminating one of the fibres to be connected and a connection block for holding the end pieces end to end with their optical fibres aligned, wherein each fibre end piece includes three cylindrical rods which lie tangentially to each other in pairs and which encompass the end of one of the fibres to be connected, and wherein the connecting block includes a tubular core having an axis of symmetry which extends parallel to the fibres to be joined and which includes a V-shaped groove formed in its outer and inner peripheries for each pair of fibres to be connected, the connecting block further including a pair of plates arranged on either side of the core, each plate receiving one fibre end piece of each pair of fibres to be connected, the end pieces projecting through their respective plates and lying in respective grooves of the core end to end with their corresponding end pieces for interconnection of their fibres; the connecting block further including means for applying transverse pressure on the three rods of each end piece to ensure proper alignment of each fibre in its V-shaped groove.

7. A device according to claim 6 wherein each of said fibre end pieces includes a thermoshrinkable ring surrounding said rods and acting as a stop to define a predetermined distance between the ring and the end of the fibre.

8. A device according to any one of claim 6 wherein: said rods and fibre of each fibre end piece are held together by cementing with a hardening resin.

9. A device according to claim 6, wherein the plates are circular.

10. A device according to claim 6, wherein the means for applying transverse pressure are constituted by clamping shoes mounted for clamping movement perpendicular to the axis and bearing against an outer hoop which surrounds the core.

11. A device according to claim 6, wherein said means for applying transverse pressure are constituted by at least one cylinder or tube made of an elastomer whose axis is parallel to that of the core, said cylinder or tube made of elastomer being compressed under the effect of means for bringing said plates closer together.

12. A device according to claim 11, wherein said means for bringing said plates closer together are formed by clamping a nut on an axial rod.

13. A device according to claim 6, wherein: each of said fibre end pieces includes a thermoshrinkable ring surrounding said rods and acting as a stop to define a predetermined distance between the ring and the end of the fibre.

14. A device according to claim 6, wherein: said rods and fibre of each fibre end piece are held together by cementing with a hardenable resin.

* * * * *